United States Patent [19]

Gaske et al.

[11] 4,016,333

[45] Apr. 5, 1977

[54] RADIATION CURABLE COATINGS HAVING NONADHERENT SURFACES

[75] Inventors: Joseph E. Gaske; Nick T. Georgas, both of Chicago, Ill.

[73] Assignee: DeSoto, Inc., Des Plaines, Ill.

[22] Filed: Oct. 25, 1974

[21] Appl. No.: 518,004

[52] U.S. Cl. .......................... 428/447; 204/159.13; 260/29.1 SB; 260/827; 427/44; 427/54; 427/208; 428/514

[51] Int. Cl.² .......................................... B05D 3/06

[58] Field of Search .............. 427/44, 54, 208; 204/159.13; 260/824 R, 827, 29.1 SB; 106/287 SB; 428/447, 514

[56] References Cited

UNITED STATES PATENTS

| 2,959,569 | 11/1960 | Warrick | 260/827 |
|---|---|---|---|
| 2,965,593 | 12/1960 | Dietz | 260/827 |
| 3,076,726 | 2/1963 | Ault | 427/44 |
| 3,627,836 | 12/1971 | Getson | 260/827 |
| 3,726,710 | 4/1973 | Berger et al. | 427/44 |
| 3,759,807 | 9/1973 | Osborn et al. | 260/827 |

*Primary Examiner*—John H. Newsome
*Attorney, Agent, or Firm*—Dressler, Goldsmith, Clement, Gordon & Shore, Ltd.

[57] ABSTRACT

Radiation polymerizable coatings having nonadherent surfaces are provided utilizing nonaqueous emulsions of a liquid alkyl hydrogen polysiloxane in a radiation polymerizable polyethylenic liquid. Polyacrylates in combination with amines, and ultraviolet photosensitizers are particularly contemplated for rapid nonair inhibited ultraviolet cure.

13 Claims, No Drawings

RADIATION CURABLE COATINGS HAVING NONADHERENT SURFACES

The present invention relates to radiation polymerizable release coatings in which radiation (either ionizing or actinic) and particularly ultraviolet radiation, is used to speed the cure and permit the elimination of most if not all of the volatile organic solvent previously needed.

Release coatings are themselves well known and in common use. The objective is to provide coatings with a nonadherent surface which easily releases a material having a strongly adherent surface (termed an aggressive adhesive) without damaging the adhesive character of the surface which is released. This requires that the release coating be adequately cured with the agent which provides the nonadherent surface, and prevent it from transferring to the adhesive surface where it would impair the adhesive characteristic.

The purpose of this invention is to obtain this cure in a rapid and sufficiently complete radiation-induced polymerization to permit the advantages of radiation curing to be extended to the provision of superior release coatings which are economically desirable since the proportion of silicone component is small.

In accordance with this invention, a small proportion of a liquid alkyl hydrogen polysiloxane is emulsified into a radiation polymerizable polyethylenic liquid, preferably a polyacrylate, which desirably includes agents enabling rapid polymerization on exposure to ionizing or actinic radiation, preferably with actinic radiation in the presence of air. This emulsion is then applied to a substrate, typically paper, and exposed to the radiation, normally ultraviolet radiation, to provide a cured coating having a nonadherent surface which resists transfer to an adhesive surface in contact therewith. As will be understood, the emulsion which is referred to is a nonaqueous emulsion. Indeed, the absence of volatilizable components is a feature of the invention.

In accordance with conventional terminology, the term "polyethylenic" is an abbreviated version of the phrase "polyethylenically unsaturated". Also, the term "polyacrylate" does not here describe a polymer, but instead denotes an unsaturated ester of polyhydroxy alcohol with excess acrylic acid to form a plurality of acrylic acid ester groups.

Many polyethylenic liquids which polymerize on exposure to radiation are known, and the alkyl hydrogen polysiloxane can be emulsified into any of these in accordance with the invention, but polyacrylates are particularly preferred since they enable rapid cure on ultraviolet exposure. While various types of ionizing or actinic radiation are known for the radiation cure of polyethylenic liquids, such as beta radiation or electron beam radiation, these are less convenient or more expensive, and the preference for ultraviolet radiation will be readily appreciated by the art.

Many liquid polyacrylates are available, these normally being the reaction product of at least two mols of acrylic acid with one mol of a polyhydric alcohol, both direct and transesterification being available as production methods. The polyhydric alcohol may be fully or partially acrylated, and both types of products are useful herein. Polyacrylates containing from 2–4 acrylate groups per molecule are preferred. The invention will be illustrated using trimethylol propane triacrylate, but many other polyacrylates are fully useful such as butylene glycol diacrylate, trimethylol propane diacrylate, glyceryl triacrylate, pentaerythritol, di-, tri- or tetraacrylate, sorbitol tetraacrylate, epoxy polyacrylates, such as a bisphenol-based diglycidyl ether having a molecular weight of 350–1000 reacted with acrylic acid to incorporate from 3–4 acrylate groups per molecule, and similar polyacrylates. As will be apparent, the plurality of radiation polymerizable ethylenic groups is essential, but other reactive groups which do not induce excessive instability may be present, the hydroxy groups having been noted above. It is preferred, however, for greatest stability, to have the plurality of acrylate groups provide the sole functionality.

This invention prefers an ultraviolet cure as noted hereinbefore, and this requires the presence of an ultraviolet sensitizer which will be illustrated herein by benzophenone. The class of ultraviolet sensitizers is itself well known and it not a feature of this invention, other photosensitizers being illustrated by benzoin ethers, such as the methyl or butyl ethers.

It is particularly preferred that the ultraviolet cure be carried out in the presence of air since, while it is feasible to exclude air with a nitrogen or carbon dioxide blanket, it is inconvenient to do so. Amines are desirably included to speed the cure in the presence of air, those amines containing amino hydrogen being particularly preferred, especially monosecondary amines such as diethyl amine which are prereacted with a portion of the acrylate groups in the polyacrylate to form a Michael addition reactant product as more fully taught in my prior application Ser. No. 290,068, filed Sep. 18, 1972, now U.S. Pat. No. 3,844,916. Thus, the liquid polyacrylates used herein are preferably illustrated by the reaction product of trimethylol propane triacrylate with about 5 weight percent of diethyl amine. The patent referred to contains numerous further illustrations of polyacrylates and amines which are useful herein. The tertiary amines such as methyl diethanol amine, are less preferred, and do not form Michael addition reaction products, but they are also useful herein.

Stabilizers may also be present, these being optional; anthraquinone and 2-hydroxy, 4-octyloxy benzophenone illustrating these.

The amines are conveniently used in an amount of from 0.1–20%, based on the weight of the liquid polyacrylate. When using the preferred monosecondary amines, these are preferably used in an amount of from 0.5–15%, based on the weight of the polyacrylate.

The nonadherent surface characteristic is provided using a liquid alkyl hydrogen polysiloxane. These are known compounds, and it is even known to have them present in nonadherent coatings, though for a different purpose. This is illustrated in U.S. Pat. No. 3,628,996 where a hydroxy endblocked dimethylsiloxane gum is applied from organic solvent solution, and 1 percent of a methyl hydrogen polysiloxane fluid is used as a crosslinking agent. Any liquid alkyl hydrogen polysiloxane can be used herein.

The term "siloxane" is a conventional one, defining the structure:

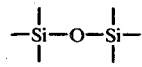

which may recur to provide the desired molecular weight which may vary considerably so long as the product is a liquid at room temperature.

The siloxanes which are preferably used in this invention are substituted only with alkyl group and hydrogen groups, and have the structure:

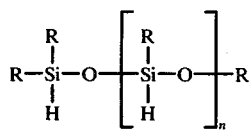

where $n$ is a number of from 1–100, but is preferably in the range of 4–30, and R is an alkyl group preferably containing from 1–4 carbon atoms, and is most preferably a methyl group. The structural formula is not intended to restrict the ratio of alkyl groups to hydrogen groups which can vary.

More particularly, the ratio of alkyl groups to hydrogen groups in the above structure may vary from 1:10 to 10:1, but is preferably in the range of 1:2 to 2:1. A fluid having the above structure in which the ratio of methyl groups to hydrogen groups is about 1:1 and in which n is about 15 (providing a molecular weight of about 1000) is particularly preferred, and will be used herein as an illustration (identified as methyl hydrogen polysiloxane "A"). The described material has a specific gravity at 25° C. of 1.0 gm. per cc. and a viscosity at 25° C. of 30 centistokes. A product of this general description which may be utilized herein is available from Dow Corning under the description DC 1107.

The liquid alkyl hydrogen polysiloxane is emulsified into the photopolymerizable polyethylenic liquid using vigorous agitation and an emulsifying agent can be used to promote emulsion stability so that the product can be stored for long periods of time. Naturally, one can use the emulsion promptly, and it is even possible to agitate the emulsion as it is applied, so that emulsion stability is not a necessary element in this invention. Nonetheless, it is convenient to have a stable emulsion, and it has been found that silicone oils, such as the General Electric silicone oil SF-1066 provides desired emulsion stability. Dow Corning also has available appropriate emulsifiers, these being polymethylsiloxane-polyoxyethylene copolymers sold as 470A, 471A, 472, 473 and 474A.

The proportion of the liquid alkyl hydrogen polysiloxane in the emulsion can vary from 2 to about 50 weight percent, it being peferred to use from 4–20 percent.

Application of the emulsion to paper can employ any convenient coating technique, such as roll coating, gravure, brushing, etc., and only a brief exposure to ultraviolet light is required for cure, as will be illustrated hereinafter.

EXAMPLE 1

91.65 parts by weight of trimethylol propane triacrylate are mixed with 4.23 parts of diethyl amine, and the mixture is heated and refluxed at a maximum temperature of 50° C. to consume the amine in the production of a liquid unsaturated Michael addition reaction product (polyacrylate liquid). After cooling the polyacrylate liquid to room temperature while sparging with air, 0.05 part of anthraquinone, 2.85 parts benzophenone, 0.81 part of 2-hydroxy-4-octyloxy benzophone, and 0.41 part of General Electric silicone oil SF-1066 are added thereto with warming to dissolve, these operations being carried out in the absence of actinic radiation.

8 parts of methyl hydrogen polysiloxane "A" are then added with agitation to form an nonaqueous emulsion in which the methyl hydrogen polysiloxane fluid forms the dispersed or discontinuous phase, and the polyacrylate liquid forms the continuous phase.

This emulsion was coated on paper in the form of a thin film which was cured by ultraviolet light exposure using three Hanovia 200 watt per inch lights focused on the paper using an elliptical reflector. The coated paper was passed beneath the lamps at the rate of 150–200 feet per minute providing a fully cured nonadherent surface from which aggressive adhesives were easily removed without significant loss in adhesive strength.

The product obtained at a web speed of 150 feet per minute was insoluble in methyl ethyl ketone, there was no smeary oil feel at the surface, and visual observation could not detect any removal of the silicone coating onto a cellophane tape coated with an aggressive adhesive, Minnesota Mining Tape No. 610. This lack of removal of silicone may also be noted by a subsequent face-to-face adhesion test.

Union Carbide Corporation has available a preferential surface cure unit which employs a nitrogen atmosphere to blanket the film being cured, and this apparatus permits curing without the use of amine as contrasted to the Hanovia lamps noted hereinbefore. An equivalent cure can be obtained without amine using the Union Carbide cure unit at 100 feet per minute.

It is desired to stress that the presence of amine is important to the capacity for rapid cure in the presence of air. Omitting the diethyl amine in Example 1, the Hanovia arc lamps do not provide conversion to a solid film, even using repeated passes under the lamps at 20 feet per minute.

Replacement of the amine containing active hydrogen with a tertiary amine, such as dimethyl ethanol amine, enables a proper cure to be obtained, but storage stability of the emulsion is not as good as evidenced by the evolution of hydrogen and earlier gelation.

The invention is defined in the claims which follow.

We claim:

1. A radiation polymerizable nonaqueous emulsion adapted to deposit coatings having nonadherent surfaces comprising a radiation polymerizable polyethylenically unsaturated liquid having emulsified therein from 2–50%, based on the weight of the emulsion, of a liquid alkyl hydrogen polysiloxane.

2. An emulsion as recited in claim 1 in which said polysiloxane has the formula:

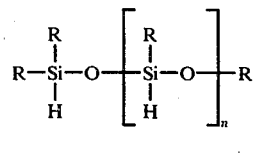

in which n is a number of 1–100, R is an alkyl group containing from 1–4 carbon atoms, and the ratio of alkyl groups to H groups is in the range of 1:10 to 10:1.

3. An emulsion as recited in claim 2 in which R is methyl and the ratio of methyl to H is in the range of 1:2 to 2:1.

4. An emulsion as recited in claim 1 in which said emulsion includes agents rendering the emulsion rapidly polymerizable on exposure to ultraviolet light.

5. An emulsion as recited in claim 4 in which said polyethylenically unsaturated liquid is a polyacrylic ester of a polyhydroxy alcohol.

6. An emulsion as recited in claim 5 in which an amine is also present.

7. An emulsion as recited in claim 5 in which said polyacrylic ester is reacted with a proportion of an amine containing amino hydrogen to provide an unsaturated Michael addition reaction product.

8. An emulsion as recited in claim 7 in which said polyacrylic ester is formed by reaction of an aliphatic polyhydric alcohol with at least two mols per mol of alcohol of acrylic acid, said polyacrylic ester being reacted with a monosecondary amine to provide an unsaturated Michael addition reaction product.

9. An emulsion as recited in claim 8 in which said amine is diethyl amine.

10. A radiation polymerizable nonaqueous emulsion adapted to deposit coatings with nonadherent surfaces comprising a liquid polyacrylic ester of a polyhydroxy alcohol containing from 2–4 acrylate groups per molecule, said liquid polacrylic ester having emulsified therein from 2–50%, based on the weight of the emulsion, of a liquid alkyl hydrogen polysiloxane having the formula:

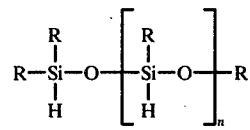

in which n is a number from 4–30, R is an alkyl group containing from 1–4 carbon atoms, and the ratio of alkyl groups to H groups is in the range of 1:2 to 2:1, said emulsion further including an ultraviolet light sensitizer, an emulsifier for maintaining said polysiloxane in stable emulsion, and from 0.1–20%, based on the weight of said polyacrylic ester of an amine.

11. An emulsion as recited in claim 10 in which said amine is a monosecondary amine present in the form of a Michael addition reaction product, said amine being used in an amount of from 0.5–15%.

12. A method of producing release coated paper comprising applying to a surface of a sheet of paper a film of a liquid emulsion as recited in claim 1, and then exposing the wet coated surface to radiation to cure the same.

13. Release coated paper produced by the method of claim 12.

* * * * *